(12) United States Patent
Nicolson et al.

(10) Patent No.: US 7,183,903 B2
(45) Date of Patent: Feb. 27, 2007

(54) SECURITY STORAGE LOCKER FOR A VEHICLE

(76) Inventors: Peter Nicolson, 1A Southern Ave., Blackwood, South Australia (AU) 5051; Andrew Nicolson, 1A Southern Ave., Blackwood, South Australia (AU) 5051

( * ) Notice: Subject to any disclaimer, the term of this patent is extended or adjusted under 35 U.S.C. 154(b) by 178 days.

(21) Appl. No.: 11/104,656

(22) Filed: Apr. 13, 2005

(65) Prior Publication Data
US 2005/0242930 A1 Nov. 3, 2005

(30) Foreign Application Priority Data
Apr. 15, 2004 (AU) ............................... 2004901971

(51) Int. Cl.
*B60R 25/10* (2006.01)
(52) U.S. Cl. ............................... 340/426.36; 340/426.34; 340/426.35; 109/51; 307/10.4
(58) Field of Classification Search ............ 340/426.1, 340/426.11, 426.12, 426.13, 426.23, 426.34, 340/426.35, 426.36; 307/10.4; 70/18, 422; 109/51, 59 T; 116/62.4
See application file for complete search history.

(56) References Cited

U.S. PATENT DOCUMENTS

| | | | |
|---|---|---|---|
| 3,818,436 A * | 6/1974 | Hong | 361/171 |
| 3,847,292 A * | 11/1974 | Williams et al. | 414/541 |
| 4,802,437 A * | 2/1989 | Felicetti | 116/62.4 |
| 4,926,762 A * | 5/1990 | Paul | 109/51 |
| 6,741,166 B1 * | 5/2004 | Sanchez | 340/426.34 |

FOREIGN PATENT DOCUMENTS

| GB | 2318333 A | 4/1998 |
|---|---|---|
| GB | 2331278 A | 5/1999 |

* cited by examiner

*Primary Examiner*—Van T. Trieu
(74) *Attorney, Agent, or Firm*—Dowell & Dowell P.C.

(57) ABSTRACT

A security locker is for securing articles externally on a vehicle. The locker comprises a locker having at least one opening facing the exterior of the vehicle when the locker is fitted thereto, wherein the opening provides access to the interior of the locker. A door is moveable between an open position in which the interior of the locker is accessible through the opening from outside of the vehicle when the locker is fitted thereto, and a closed position in which the locker is inaccessible. The locker includes locking device that, when activated, locks the door in a closed position to prevent unauthorized access to the locker, and when deactivated unlocks the door to enable access to the locker. An input device is operatively connected to the locking device, wherein the locking device is accessible from outside the locked vehicle and it deactivates the locking device when an identifiable code is entered to thereby allow keyless entry to the locker. An interface connects the input device to a security system of the vehicle such that entry of the identifiable code into the input device results in activation or deactivation of the security system.

16 Claims, 16 Drawing Sheets

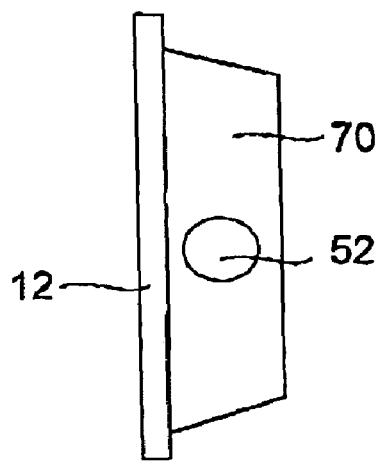
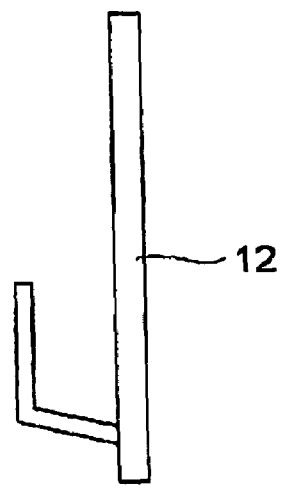
FIGURE 15     FIGURE 16
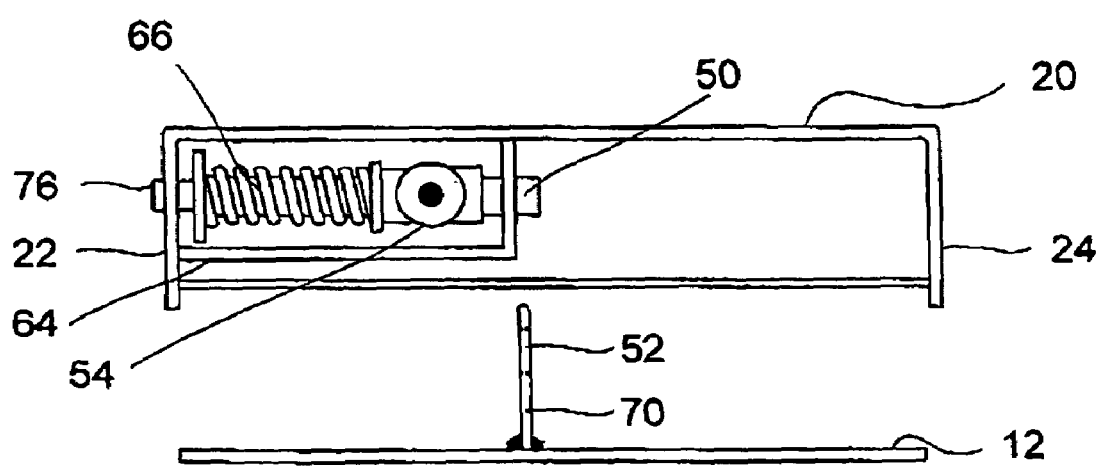
FIGURE 17

SECURITY STORAGE LOCKER FOR A VEHICLE

FIELD OF THE INVENTION

The present invention relates to the area of vehicle security, and more specifically to storage lockers that can be used to securely store articles, such as car keys, wallets and mobile phones, externally on a vehicle.

BACKGROUND OF THE INVENTION

There are numerous occasions during the use of a vehicle such as a motor car that it is necessary to lock the vehicle once the occupants have left the vehicle. This requires the driver to retain the vehicle key to allow re-entry to the vehicle. However, there are many occasions when it is inconvenient or impractical to keep a key within one's possession. For example, it is not normally practical for a driver to keep the key in their possession when they go swimming at the beach, especially if the immobiliser or key has an inbuilt battery. Therefore, it is common for the car keys to be left unattended on the sand whilst the driver is swimming. This presents a potential security problem as it is relatively easy for the key to be taken and therefore for the vehicle to be stolen. Other instances where it is impractical to keep a key in ones possession include outdoor activities such as bushwalking, horse riding, rock climbing and other sport participation.

To overcome this problem it has become common for drivers to "hide" the vehicle key somewhere on the vehicle, such as in a wheel arch. However, this too has become commonplace and therefore it is not uncommon for a third party to watch the driver hide the key and to then remove the key and take the vehicle illegally once the driver has left the area. There are also occasions where a spare car key is hidden on a vehicle in case of inadvertent lock-out. This too presents a security risk.

Of course, some vehicles are currently manufactured with a keyless entry system for the driver's side door but there is a need for a system for storing car keys and other valuables for use on existing vehicles that do not have keyless entry facilities.

SUMMARY OF THE INVENTION

The present invention provides a security locker for securing articles, such as car keys, externally on a vehicle, wherein the locker is able to be securely mounted to the vehicle so that a door of the locker is accessible from outside of the locked vehicle. The security locker comprises:

- a locker having at least one opening facing the exterior of the vehicle when the locker is fitted thereto, wherein the opening provides access to the interior of the locker;
- a door moveable between an open position in which the interior of the locker is accessible through the opening from outside of the vehicle when the locker is fitted thereto, and a closed position in which the interior of the locker is inaccessible;
- locking means that, when activated, locks the door in a closed position to prevent unauthorised access to the locker, and when deactivated unlocks the door to enable access to the locker;
- an input device operatively connected to the locking means, wherein said locking means is accessible from outside the locked vehicle and it deactivates the locking means when an identifiable code is entered to thereby allow keyless entry to the locker;
- an interface for connecting the input device to a security system of the vehicle such that entry of the identifiable code into the input device results in activation or deactivation of the security system.

The security system of the vehicle may be a factory fitted or after sales alarm system, an immobiliser, an ignition disabling switch/relay and/or a fuel cut-off relay. The interface may be an accessory connector for providing an electrical connection between the input device and any one or more of the aforementioned vehicle security system components. In use, a driver may open the security locker after entering the identifiable code, place keys or other items into the locker and then close and lock the locker. A second identifiable code that arms the vehicle security system may then be entered into the input device.

The input device may be a keypad that can be used to input the identifiable code. The keypad may contain a single button or a plurality of alpha-numeric keys. The keypad may be programmable to allow an authorised user to input a Personal Identification Code that can be used to activate and/or de-activate the locking means.

In one preferred form of the invention the storage locker may have dimensions that enable it to be fitted between the number plate on a vehicle and the body panel onto which the number plate is normally attached. The shape, height width and depth of the locker are preferably such that the locker is not obtrusive when it is fitted in this way.

Alternatively, the locker may be fitted into an opening that is made in a panel of the body of the vehicle. For example, the door of the locker may be shaped similarly to the flap of a petrol filling recess of a vehicle so that the locker can be fitted in the opening in the panel such that the door of the locker is flush with the panel when the door is closed. The locker may be positioned on the vehicle where one might expect to find a petrol filling point on the vehicle. In this way, it may be possible to disguise the presence of the security locker on the vehicle. Alternatively, the door of the locker may be shaped to represent a trim of the vehicle so that the locker may be disguised behind a piece of trim on the vehicle.

BRIEF DESCRIPTION OF THE FIGURES

An embodiment of the invention will now be described, by way of example only, with reference to the accompanying drawings, in which:

FIG. 15 is side view of a door of a locker in accordance with an embodiment of the invention.

FIG. 16 is side view of a door of a locker in accordance with an embodiment of the invention.

FIG. 17 is a part cross section exploded view from the top of a locker in accordance with an embodiment of the invention.

DETAILED DESCRIPTION OF THE INVENTION

FIGS. 1 to 33 show a number of different embodiments of a security locker 10 for securing articles, such as car keys, wallets and mobile phones externally on a vehicle. For the purposes of discussion in the ensuing description reference will be made to use of the security locker on a motor car. However, the invention is not to be taken to be restricted to that particular use and the vehicle could be a caravan or a trailer (such as a lockable tradesman's trailer).

General Description of the Locker 10

The security locker 10 is securely mounted to a vehicle so that a door 12 of the locker is accessible from outside the vehicle when the vehicle is locked. The locker 10 has at least one opening facing the exterior of the vehicle when the locker is fitted thereto. The opening provides access to the interior of the locker. The door 12 is moveable between an open position in which the interior of the locker is accessible through the opening from outside of the vehicle when the locker is fitted thereto, and a closed position in which the interior of the locker is inaccessible.

Figure 1:
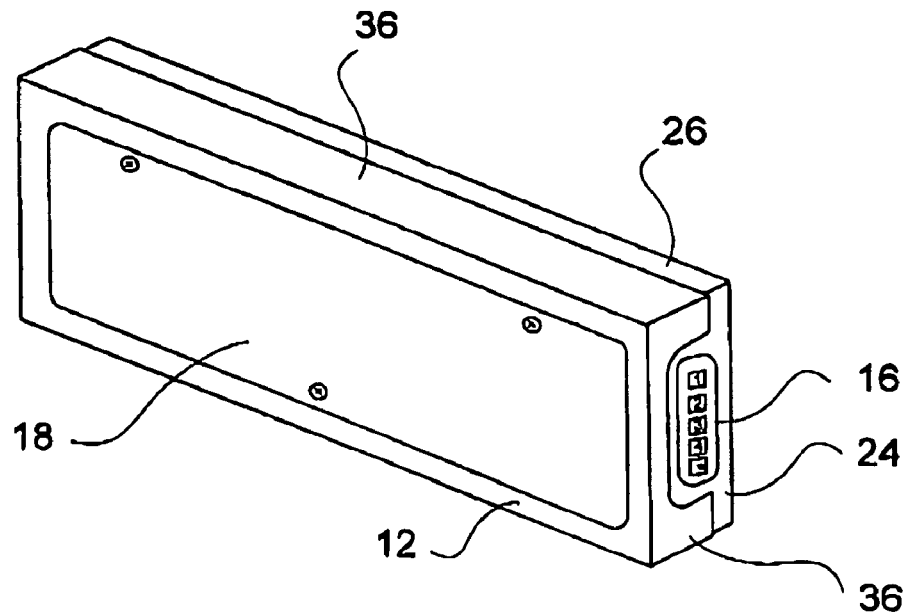
FIG. 1 is a perspective view of a locker in accordance with an embodiment of the invention with the door closed.
Figure 2:
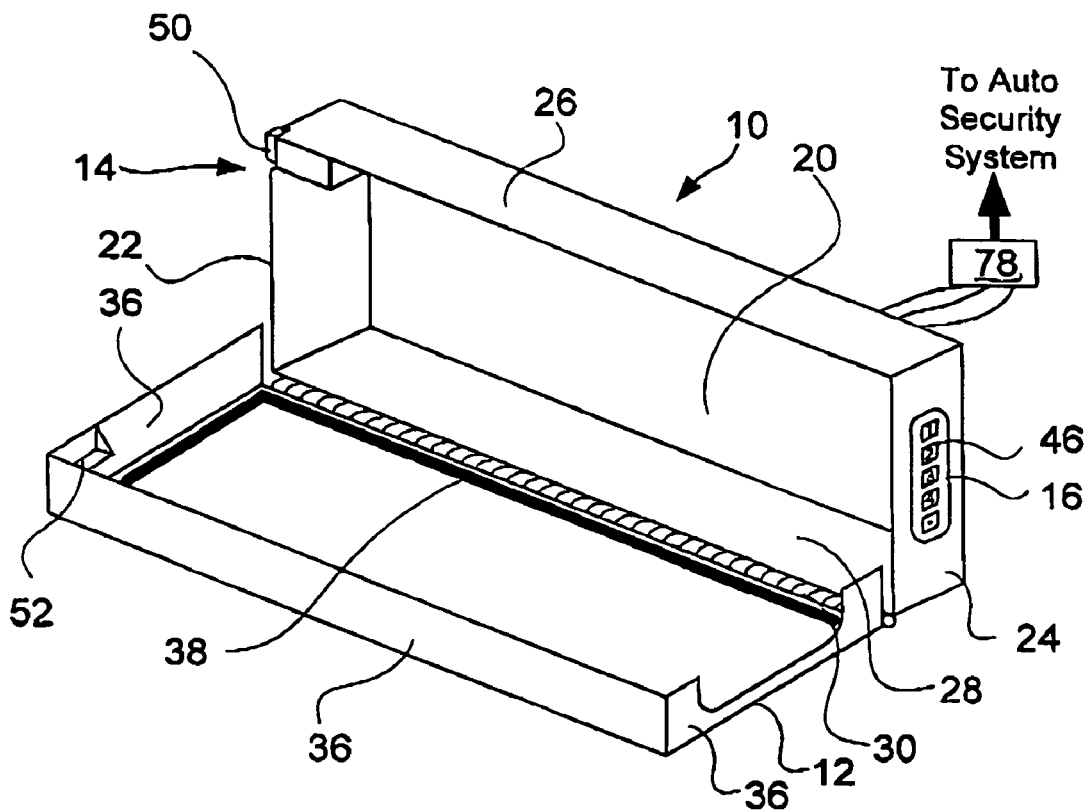
FIG. 2 is a perspective view of a locker in accordance with the embodiment of the invention shown in FIG. 1 with the door open.

The locker includes a locking means 14 that, when activated, locks the door 12 in a closed position to prevent unauthorised access to the locker (see FIGS. 1 and 2). When the locking means is deactivated it unlocks the door 12 to enable access to the locker. The locking means 14 is connected to an input device 16 that is accessible from outside the vehicle. The input device deactivates the locking means 14 when an identifiable code is entered into the input device to allow keyless entry to the locker. The locker may be retrofitted to an existing vehicle or it may be incorporated into a vehicle during vehicle manufacture.

Figure 22:
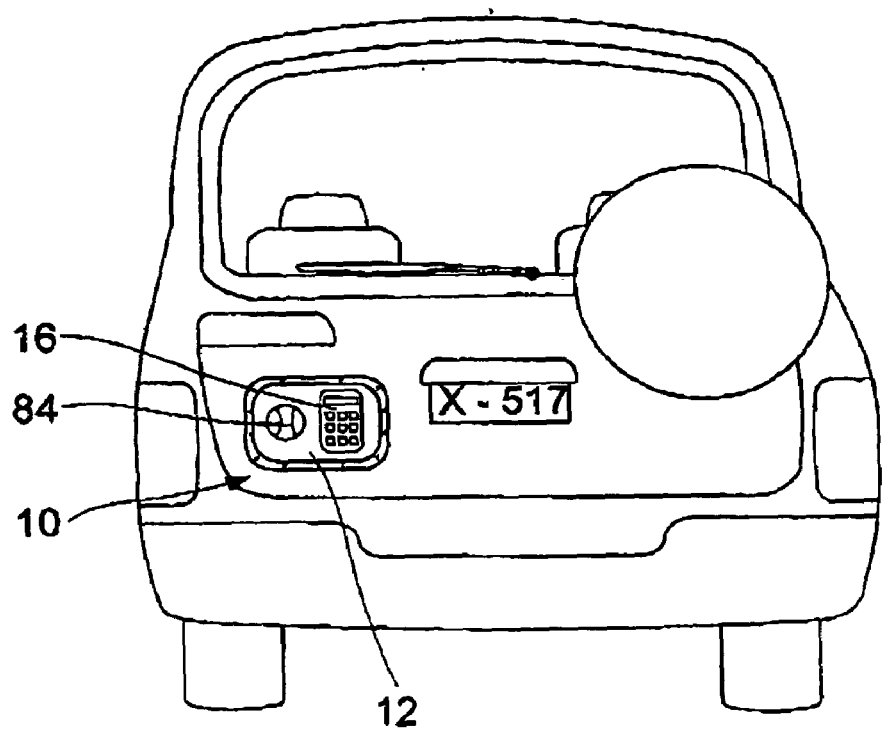
FIG. 22 is a schematic view of the rear of a vehicle showing a security locker fitted to the tailgate of the vehicle.
Figure 23:
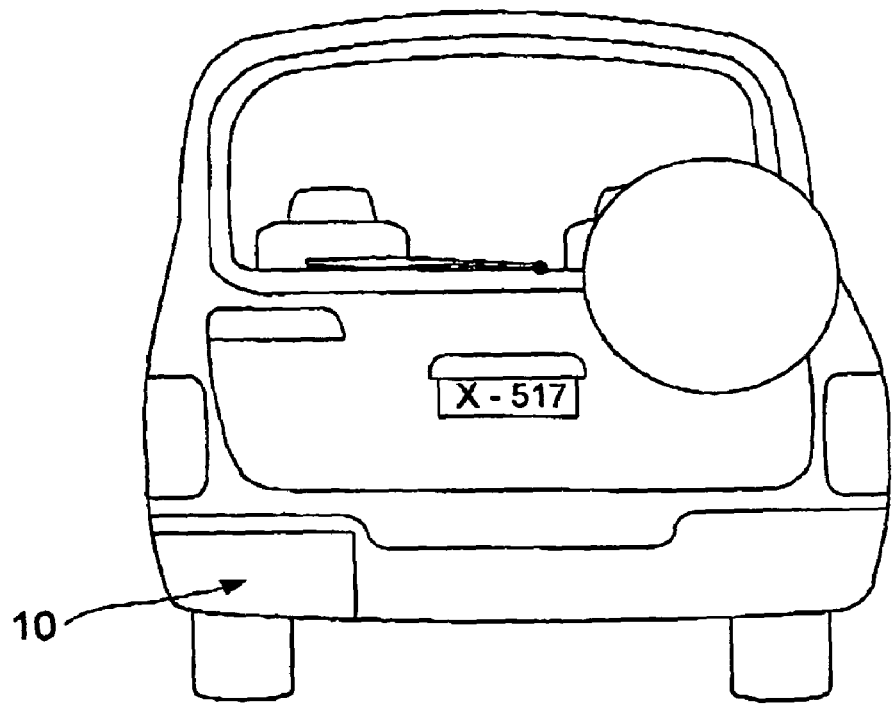
FIG. 23 is a schematic view of the rear of a vehicle showing a security locker fitted to the rear bumper of the vehicle.
Figure 24:
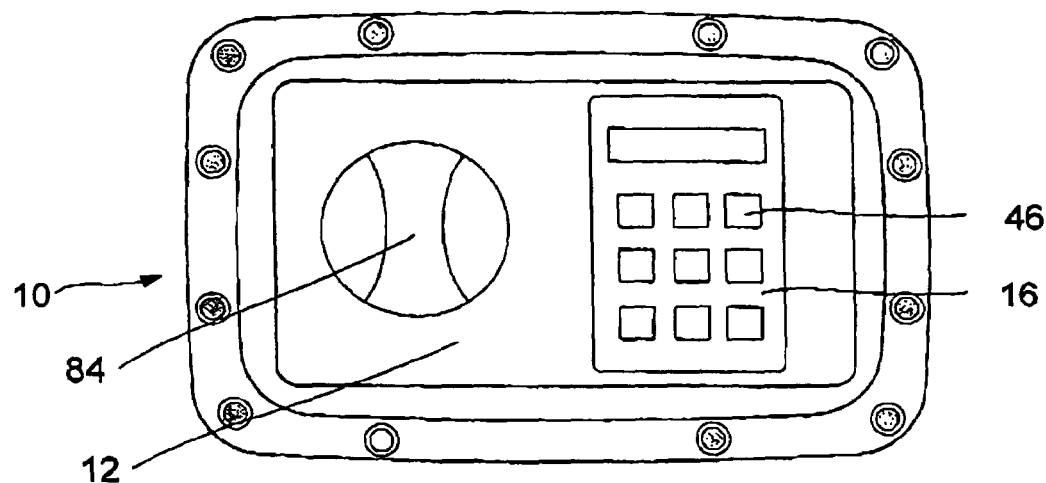
FIG. 24 is a plan view of a security locker of an embodiment of the invention.
Figure 25:
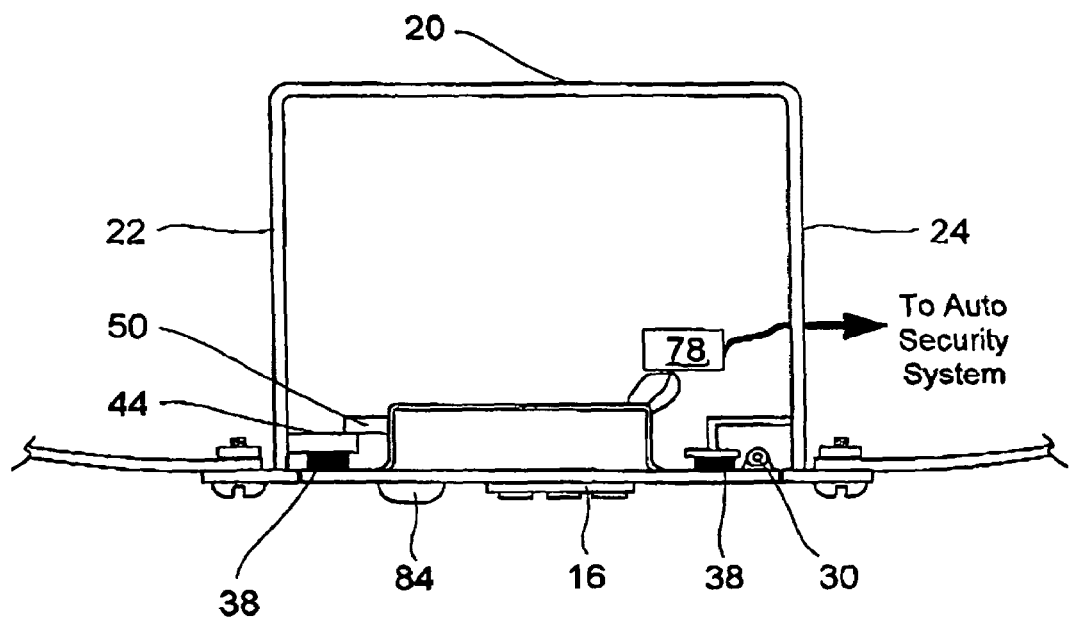
FIG. 25 is part cross sectional top view of a locker in accordance with the embodiment of the invention that is shown in FIG. 24.
Figure 26:
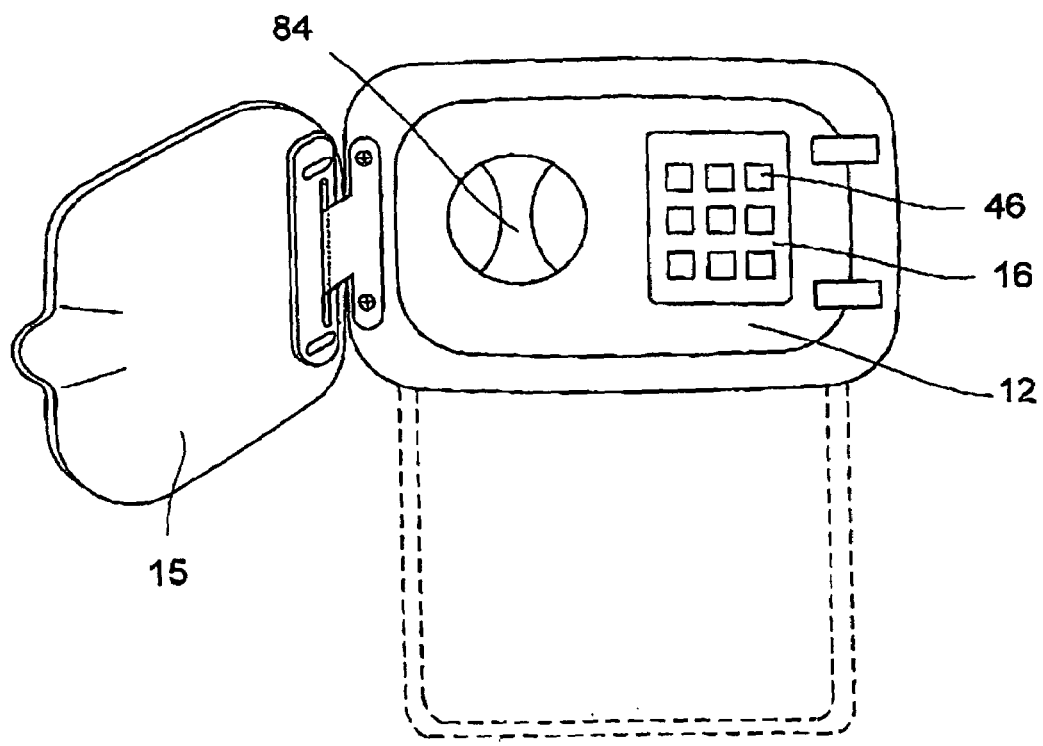
FIG. 26 is a plan view of a security locker of an embodiment of the invention.
Figure 27:
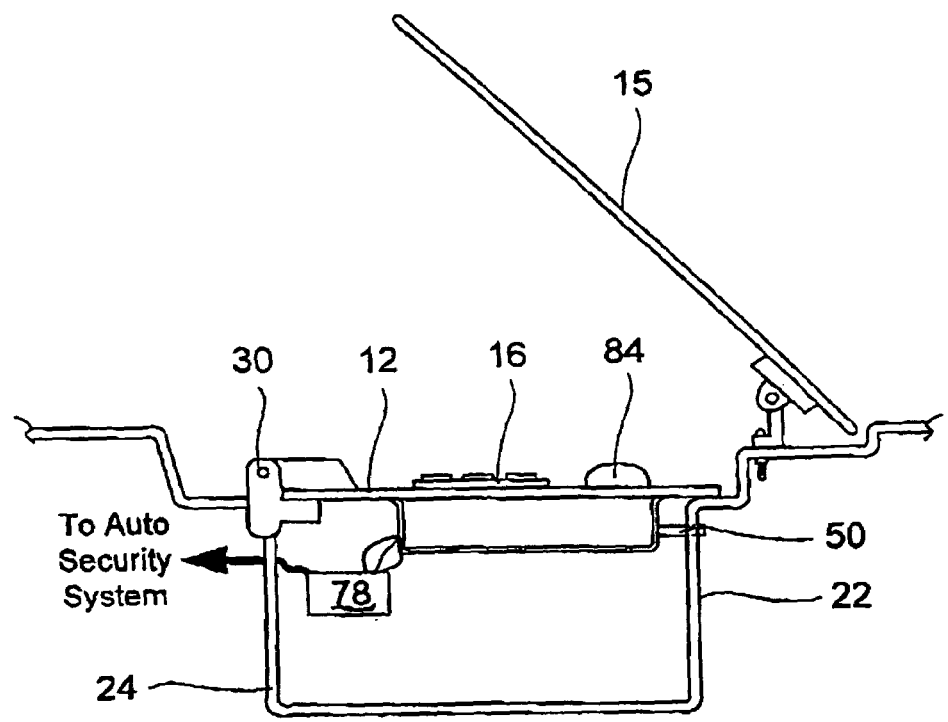
FIG. 27 is part cross sectional top view of a locker in accordance with the embodiment of the invention that is shown in FIG. 26.
Figure 28:
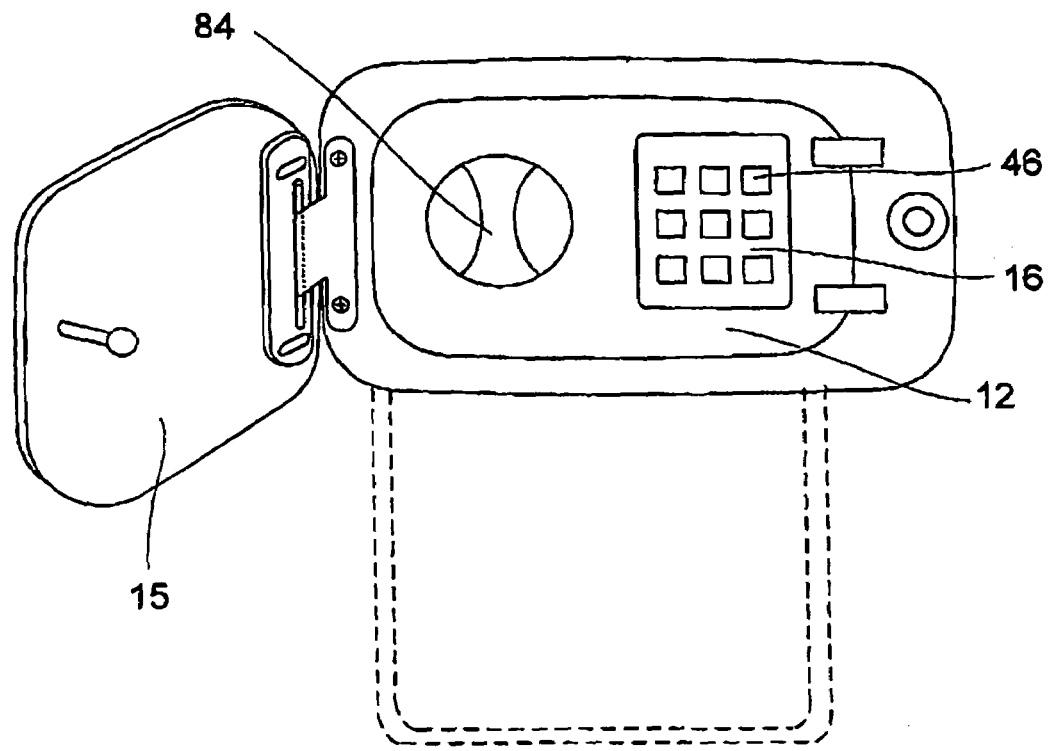
FIG. 28 is a plan view of a security locker of an embodiment of the invention.
Figure 29:
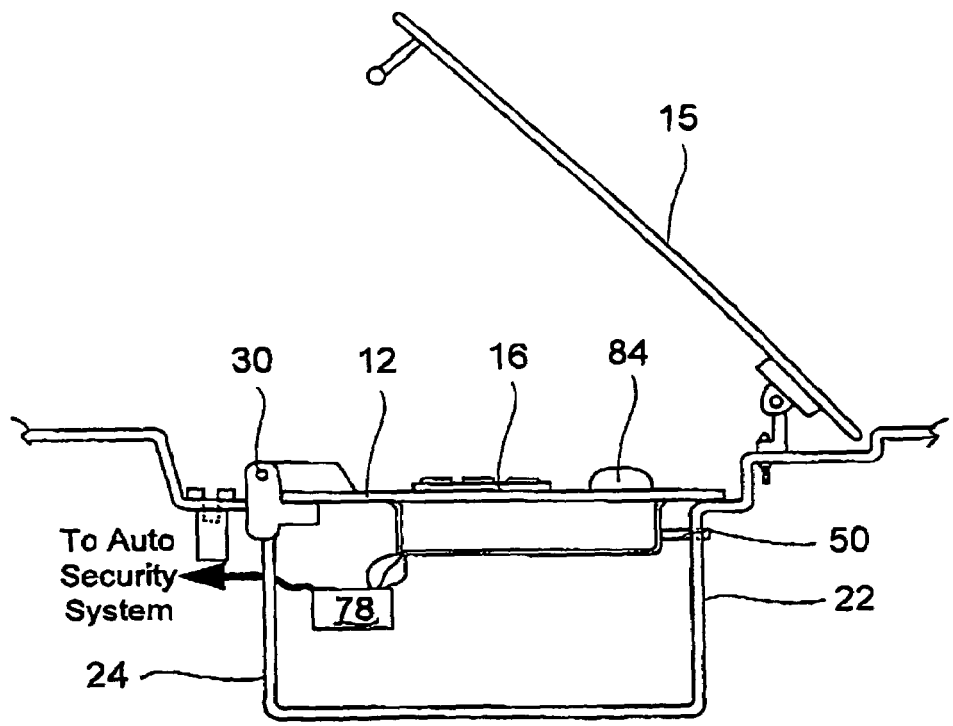
FIG. 29 is part cross sectional top view of a locker in accordance with the embodiment of the invention that is shown in FIG. 27.

The locker 10 may be any suitable size and shape. However, for aesthetic and safety reasons it is preferred that the locker is of a shape and size that it can be fitted on to a vehicle so that it is unobtrusive. The locker shown in FIGS. 1 to 21 and 30 to 33 is rectangular in plan view and is sized so that a number plate 18 can be fitted onto the front of the door, as shown in FIG. 1. By fitting the locker behind the number plate of the vehicle it is hidden somewhat by the number plate so that its presence is not overly obtrusive. An alternative configuration is shown in FIGS. 22 and 29 in which the locker is fitted into a panel of the vehicle. As shown in FIGS. 24 and 25, the locker 10 may be fitted into the panel of the vehicle so that the door 12 is flush with the panel when the door is closed. Alternatively, as shown in FIGS. 26 to 29 the door 12 of the locker 10 may be recessed within a panel of the vehicle, and a flap 15 may cover the recess in the panel. The flap 15 may be in the shape of a petrol filling cap. Alternative door configurations may also be possible. As shown in FIG. 23, the locker 10 may also be located in a panel behind a piece of trim. These configurations make it possible to "hide" the security locker on the vehicle.

The locker 10 may be formed from any material that provides it with sufficient strength to protect it against tampering or attempts at breaking it open. In a preferred embodiment of the invention, the locker is made from heavy gauge steel and is folded and welded to the required shape.

The locker 10 shown in FIGS. 1 to 21 and 30 to 33 may be about 25 mm in depth. Due to the depth of the locker, additional number plate lighting may be incorporated. For example, a prism may be mounted on top of the locker 10 so that it directs existing number plate lighting on the vehicle down onto the number plate. Alternatively, additional light bulbs may be fitted externally on the locker to illuminate the number plate. Power for the additional light bulbs may be obtained using the existing rear number plate light wiring on the vehicle.

The locker 10 comprises a back wall 20 with side walls 22, 24, a top wall 26 and bottom wall 28 extending from a front face of the back wall. The locker 10 may be retrofitted to an existing vehicle by removing the number plate from the vehicle and fixing the back wall 20 of the locker to the panel of the vehicle. The locker may be fitted using bolts that pass through the existing holes in the panel on which the number plate was fixed. The number plate 18 is then fixed to the front of the door 12. The door 12 may contain predrilled holes suitable for fixing the numberplate thereto. In some instances, it may be preferable to fix the locker to the vehicle using a more secure fastening system than the one just described to minimise the chances of the locker being forcibly removed from the exterior of the vehicle. For example, the back wall 20 of the locker may contain a number of bolts that are spot-welded to the back of the security locker. On fitting the locker, the bolts pass through existing holes in the panel of the vehicle and they are secured with large washers, spring washers and nuts. For additional security, bolts could also be passed from the boot to the security locker.

Hinging

Figure 3:
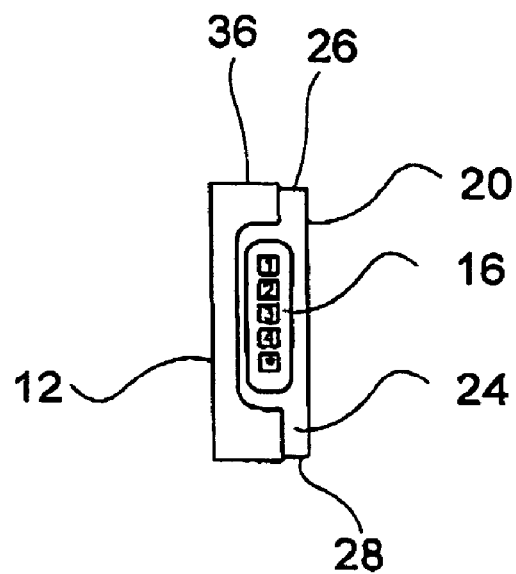
FIG. 3 is a side view of a locker in accordance with the embodiment of the invention shown in FIG. 1 with the door closed.
Figure 10:
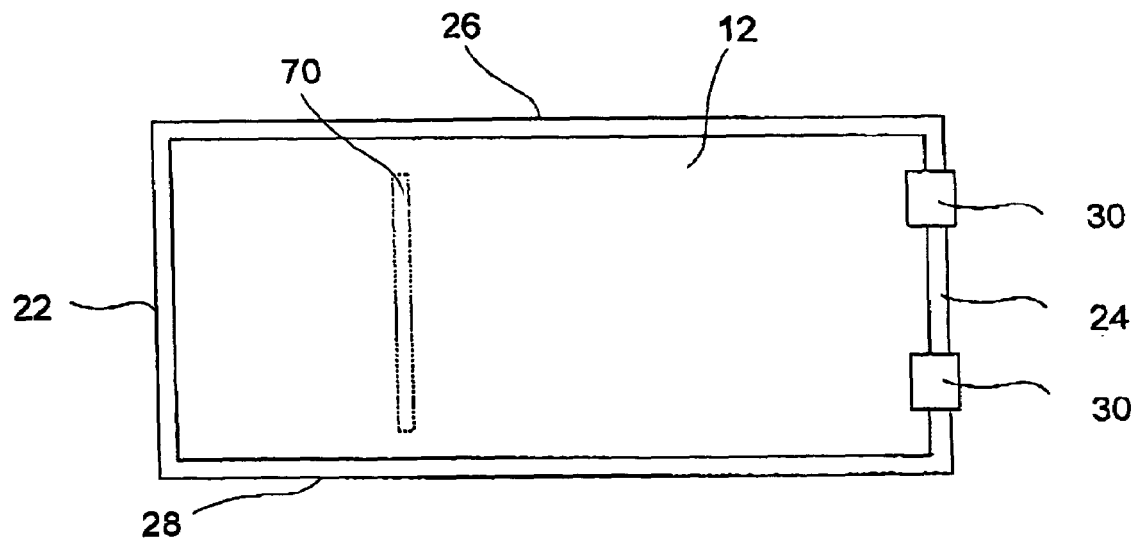
FIG. 10 is a plan view from the front of a locker in accordance with another embodiment of the invention.

The door 12 is hingedly connected to either of the side walls 22, 24, the top wall 26 or the bottom wall 28 of the locker 10. As shown in FIGS. 1 to 3, the door 12 may be connected to the bottom wall 28 through hinge 30 that extends the length of the bottom wall. In this way the door can be opened downwardly to allow access to the locker. Alternatively, as shown in FIG. 10 the door 12 may be hingedly connected to either of the side walls 22 or 24 to provide a left or right side opening door, respectively.

Any one of a number of hinge arrangements may be used. As seen in FIGS. 1 to 3, the hinge may be in the form of a piano hinge that extends the length of the bottom wall 28. As shown in FIGS. 4 to 8, two hinges 30 may be mounted externally with one at each end of the locker 10. The hinges 30 are formed from hinge sections 32a which are welded onto the bottom wall 28 of the locker, and mating hinge sections 32b which are welded onto the bottom of the door 12. The hinges 30 are assembled by inserting a hinge pin 34 through aligning apertures in each of respective hinge sections 32a and 32b. The aligning apertures may form a blind bore with a closed end of the bore facing externally to prevent access to the hinge pin 34.

Figure 9:
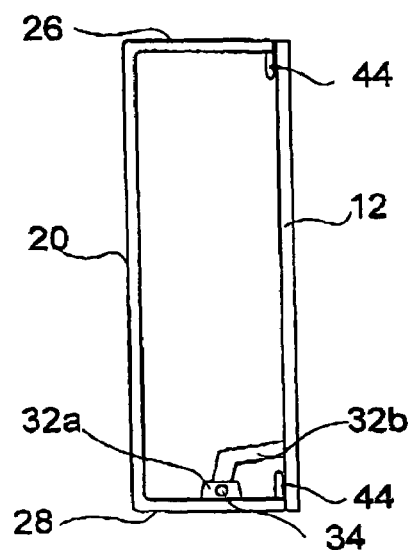
FIG. 9 is a part cross section side view of a locker in accordance with another embodiment of the invention.

A further alternative hinge arrangement is shown in FIG. 9 in which two hinges 30 are internally mounted (only one hinge is shown in FIG. 9). Again, individual hinge sections 32a and 32b are welded onto the respective sections of the locker, although other methods of fitting such as riveting and bolting are also contemplated. Hinge sections 32a are welded onto an internal face of the bottom wall 28 of the locker, and mating hinge sections 32b are welded onto a lower section of an internal face of the door 12. The hinge sections are assembled by inserting a hinge pin 34 through aligning apertures in each of respective hinge sections 32a and 32b Flanged Door Turning to the details of the door 12 in more detail. In the embodiment that is Illustrated in FIGS. 1 to 3 flanges 36 extend from an internal face of the door 12 at three sides of the door that are not adjacent the hinge 30. The flanges 36 fit snugly over the side walls 22 and 24 and the top wall 26 of the locker when the door 12 is closed. In this way, the flanges 36 are able to prevent or minimise the ingress of moisture, dust or dirt into the locker as well as making it difficult to insert an instrument such as a screwdriver between the locker and the door in an attempt to prise open the door. The internal face of the door 12 also includes a weatherproofing strip 38 about its periphery. In the illustrated embodiment the weatherproofing strip 38 is in the form of a strip of rubber seal which is sandwiched between the door 12 and walls 20, 22, 24 and 26 when the door is closed. Other weatherproofing materials may also be suitable. The weatherproofing strip also prevents or minimises the ingress of moisture and dust when the door 12 is closed.

Flanged Door With Return Section

Figure 4:
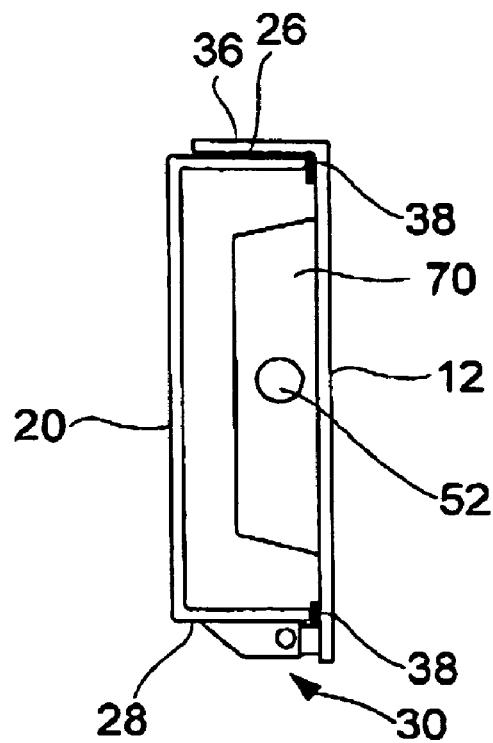
FIG. 4 is a part cross section side view of a locker in accordance with another embodiment of the invention with the door closed.
Figure 5:
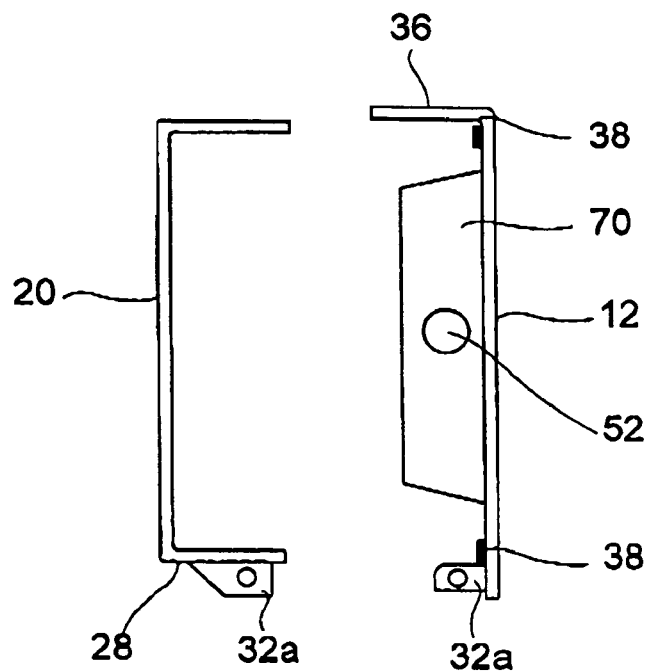
FIG. 5 is an exploded part cross section side view of the locker in accordance with the embodiment of the invention that is shown in FIG. 4.
Figure 6:
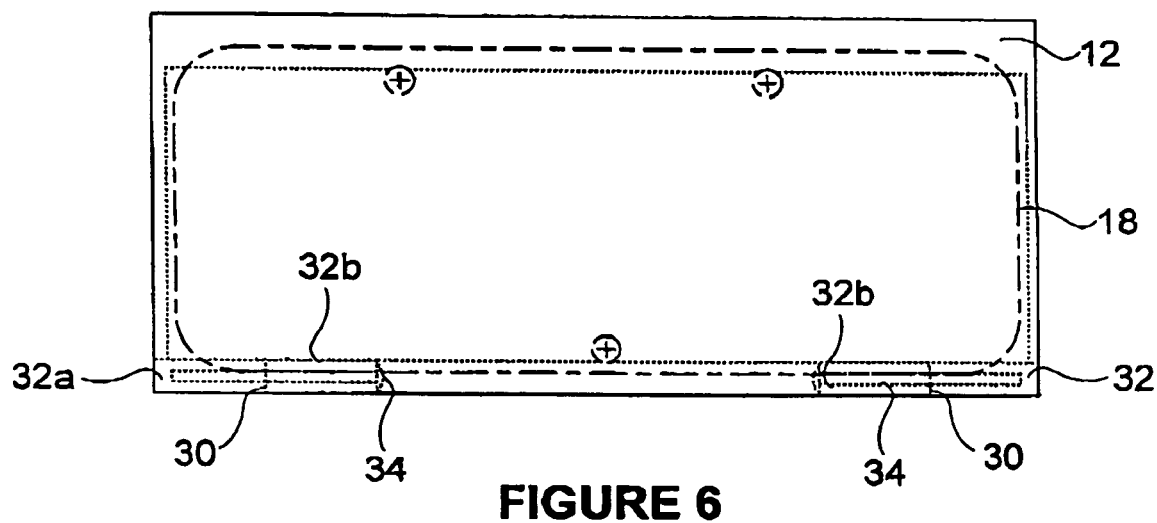
FIG. 6 is a front view of a locker in accordance with the embodiment of the invention that is shown in FIG. 4.
Figure 7:
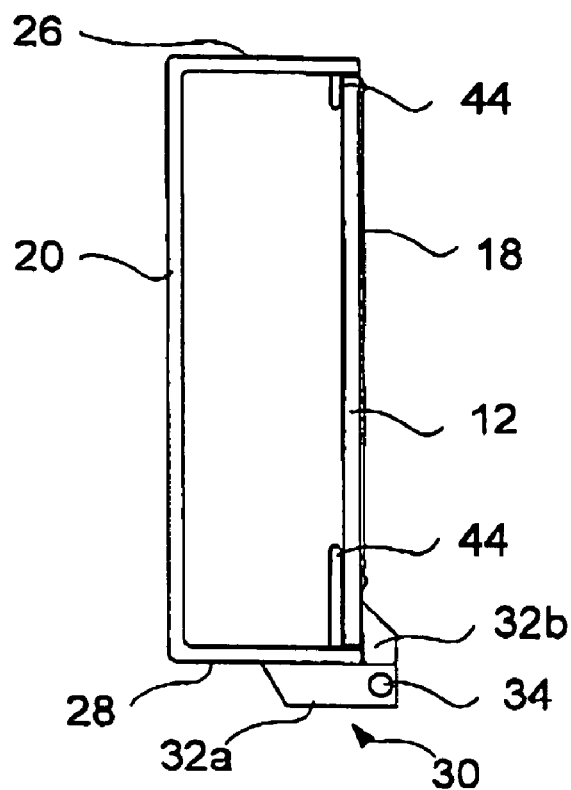
FIG. 7 is a part cross section side view of a locker in accordance with another embodiment of the invention.
Figure 11:
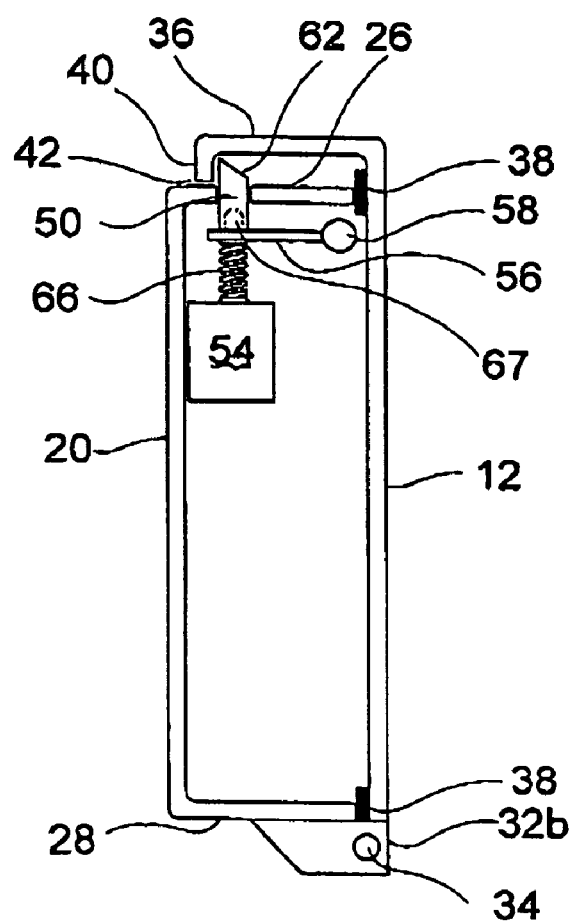
FIG. 11 is a part cross section side view from the front of a locker in accordance with another embodiment of the invention.

In another embodiment that is illustrated in FIGS. 4, 5, 6 and 11 a flange 36 on a side of the door opposite the hinge 30 (in this case the top of the door) is spaced from the corresponding wall of the locker (in this case top wall 26) when the door is closed as best seen in FIGS. 4 and 11. The flange 36 includes a return section 40 which is parallel to the door 12 and abuts the top wall 26 when the door is closed. The return section 40 acts as a catch for the locking means 14, as described in more detail later. The return section 40 also seals the door against intrusion with an instrument such as a screwdriver. This is in part because the only gap 42 into which an instrument could be inserted in an attempt to prise open the door faces backward and is in close proximity to the panel of the vehicle on which the locker is mounted, thus making insertion of a screwdriver or similar rigid elongate instrument very difficult.

Non-Flanged Door

A further embodiment of a locker having a flush mounted door 12 is shown in FIGS. 7–10, 14–21, 24–29, 32 and 33. In these Figures the door 12 is flush mounted or slightly recessed onto the locker 10. A wall of the locker that is opposite the hinge 30 contains a door stop 44 against which the door 12 rests in the closed position. The door stop is a rigid tab that is welded on to the inner faces of either or all of the side walls 22, 24 and top wall 26. The door stop 44 contains a weatherproofing strip 38 as described previously. The door 12 may be biased to the open position by a biasing means such as a spring (not shown). In this way, when the locking means 14 is deactivated the door 12 will spring open.

Figure 8:
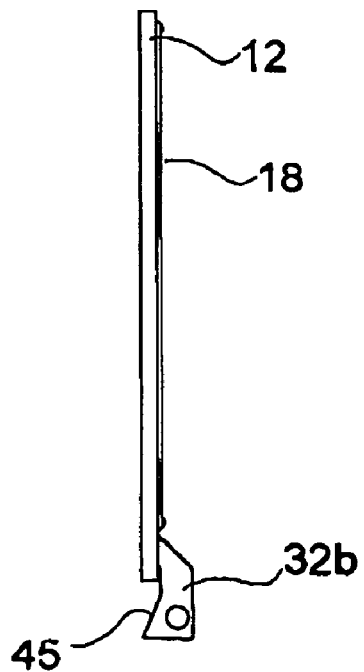
FIG. 8 is a part cross section side view of a door of a locker in accordance with the embodiment of the invention that is shown in FIG. 7.

In any of the embodiments described, the door 12 may be restricted in moving past a preset position when it is opened so as to prevent the door 12 from swinging open and damaging the paintwork of the vehicle. For example, a flexible lead may be fitted to a side wall of the locker and to an inner face of the door 12 and the length of the lead may prevent the door from swinging open past a set position. Alternatively, the hinge may be shaped so as to prevent full opening of the door 12. As shown in FIG. 8, the hinge section 32b may contain a hinge stop 45 that bears against the bottom wall 28 once the door 12 has reached a certain angle relative to the locker 10.

Input Device 16

A wall of the locker houses an input device 16 in the form of an alpha-numeric keypad, or individual input button(s). In the embodiment that is illustrated in FIGS. 1 to 3 the keypad 16 is housed on the side wall 24. The keypad contains four alpha-numeric keys (respectively labelled '1', '2', '3' and '4') 46 as well as an arming key (labelled '*') 46. The alpha numeric keypad 16 is programmable with a Personal Identification Code ('PIC') that can be used to activate and deactivate the locking means 14. In use, one enters the PIC into the keypad 16 which then unlocks the door 12. Articles are then placed in the locker and the door 12 is closed. After the door 12 has been closed a secondary input may be used to subsequently activate the security system of the vehicle. The secondary input may be the arming key 46 marked '*'. On returning to the vehicle, the secondary input may be deactivated by entering the PIC into the keypad 16 which serves to deactivate the vehicle security system and also unlock the locker 10.

Figure 13:
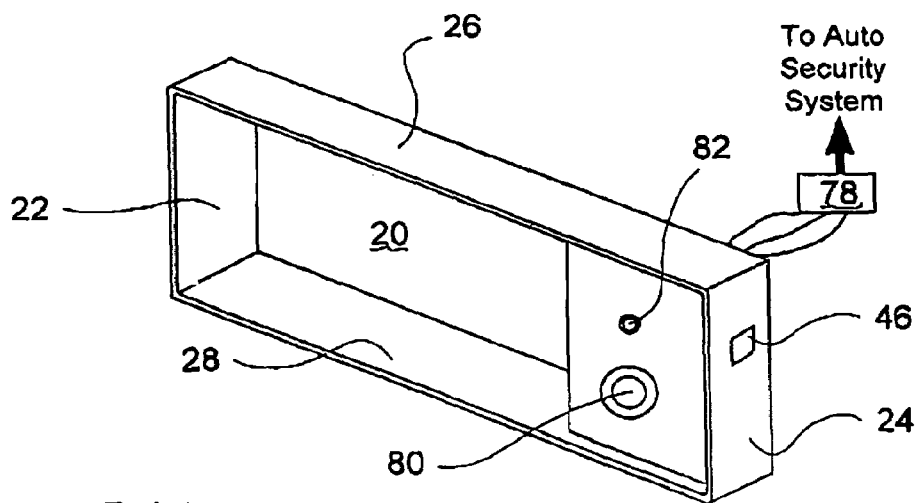
FIG. 13 is a perspective view of a locker (door not shown) in accordance with another embodiment of the invention.

Another embodiment of input device 16 is illustrated in FIG. 13 in which the keypad 16 comprises a single key 46 that is mounted on side wall 24. The single key keypad 16 may be programmed with a multi-digit PIC and the number (e.g. 1–9) may be entered by pressing the key a number of times corresponding to the number to be input. The keypad may be programmed such that a relatively short interval between presses is used to denote entry of a digit, whereas a relatively long interval between presses is used to indicate the end of input of a number. For example, the input sequence 'press-press-press- - - - - - press - - - - - - press-press - - - - - - press-press-press-press-press' represents the input of the numbers 3125 in that order.

Figure 30:
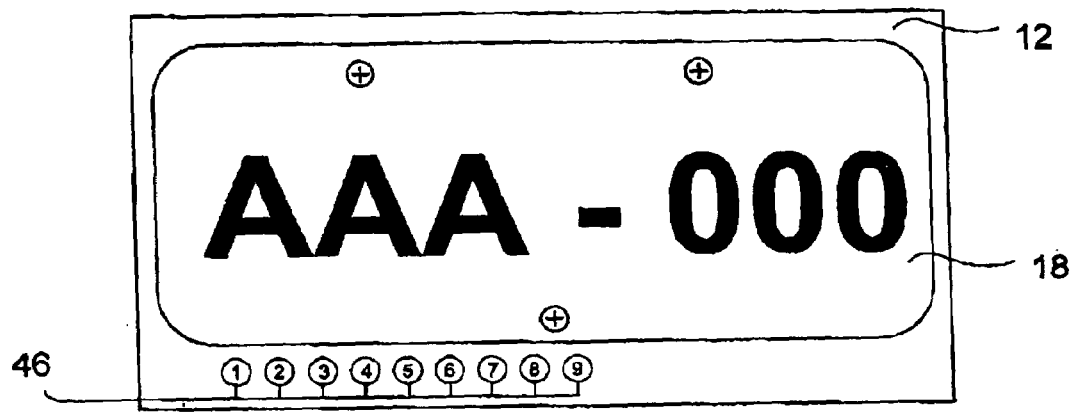
FIG. 30 is a schematic view from the front of a locker in accordance with an embodiment of the invention showing an alternative keypad position.
Figure 31:
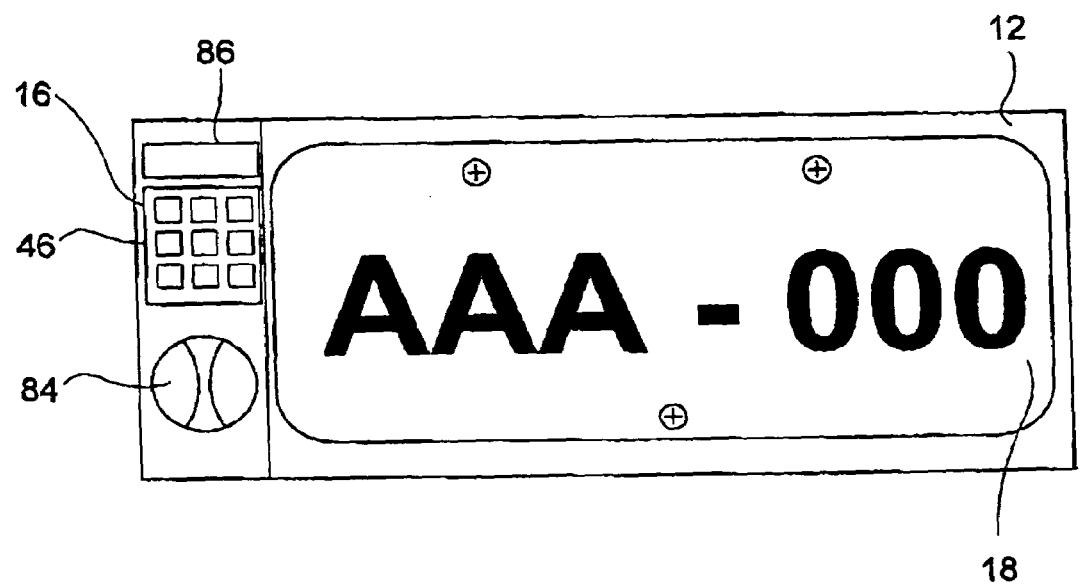
FIG. 31 is a schematic view from the front of a locker in accordance with an embodiment of the invention showing an alternative keypad position.
Figure 32:
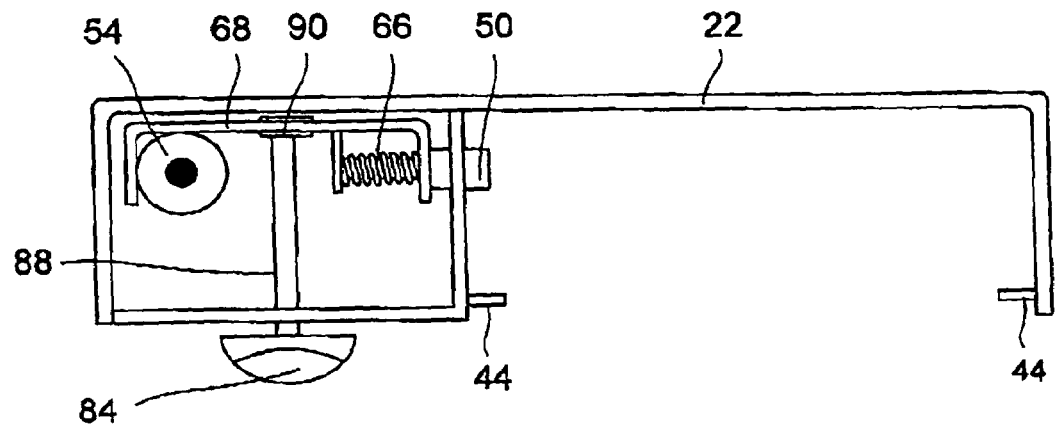
FIG. 32 is a part cross sectional top view of a locker in accordance with an embodiment of the invention.
Figure 33:
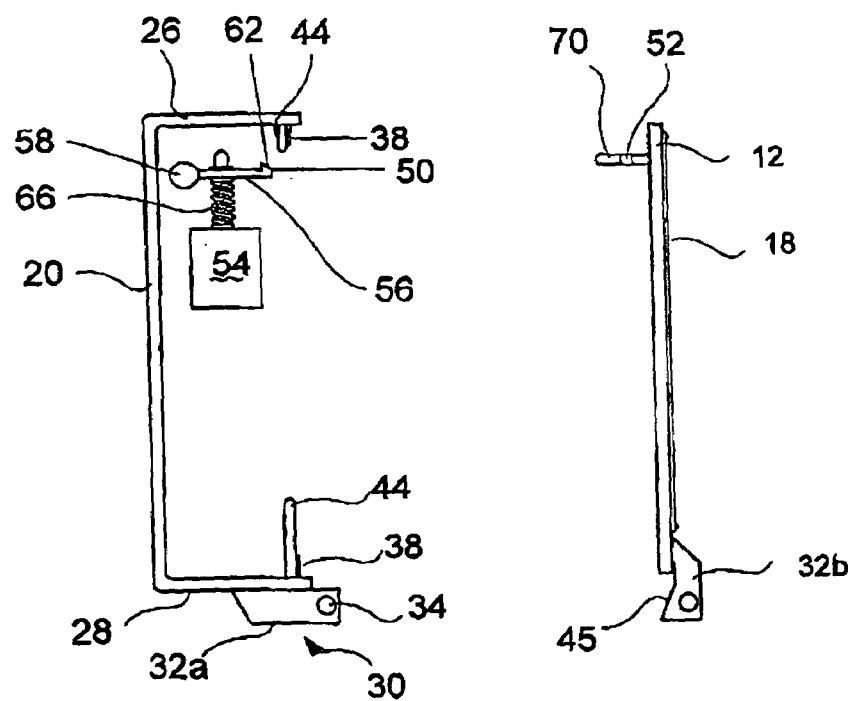
FIG. 33 is a part cross sectional exploded side view of a locker in accordance with an embodiment of the invention.

Many suitable keypads are commercially available and it is envisaged that many of the commercially available keypads could be used provided that they are weatherproof and small enough to be fitted onto the locker 10. For example, the keypad may be a sealed keypad, a public environment keypad, a hexa-decimal keypad, a miniature keypad, a sub-miniature keypad, a self-adhesive membrane keypad or any sealed single pole momentary action panel mounted switch with normally open contacts. The keypad 16 may be position at any suitable position on the locker, and for example it is contemplated that the keypad may be in the form of a series of small keys 46 in a horizontal row on the front of the locker under the number plate 18 as shown in FIG. 30. Alternatively, the keys 46 could be in a matrix to one side of the number plate 18 as shown in FIG. 31.

The input device 16 is connected to a relay 48 which activates the locking means 14 to unlock the door 12. The relay will generally be located on the vehicle external to the locker 10 and may be a relay that is part of an existing security system on the vehicle.

Locking Means 14

A number of configurations are possible for the locking means 14. Generally, the input device 16 turns on the relay 48 for a few seconds if someone enters the valid PIC. The relay can operate a power-to-open type electric strike with a shorting contact or a power-to-hold type electromagnetic lock with a breaking contact. Generally, the locking means will comprise a locking pin 50 which can be actuated between locking and unlocking positions in response to a signal from the relay 48. The locking pin 50 will normally be biased to an extended position in which it engages a suitably configured catch 52 on the door 12 that is positioned on the internal face of the door so that when the door is closed the locking pin 50 engages the catch 52 in such a way that the door 12 cannot be opened. A surface on either the locking pin 50 or the catch 52 may be bevelled so that when the door is moved from the open to the closed position the locking pin 50 and catch 52 ride over one another to force the locking pin 50 to retract.

Figure 12:
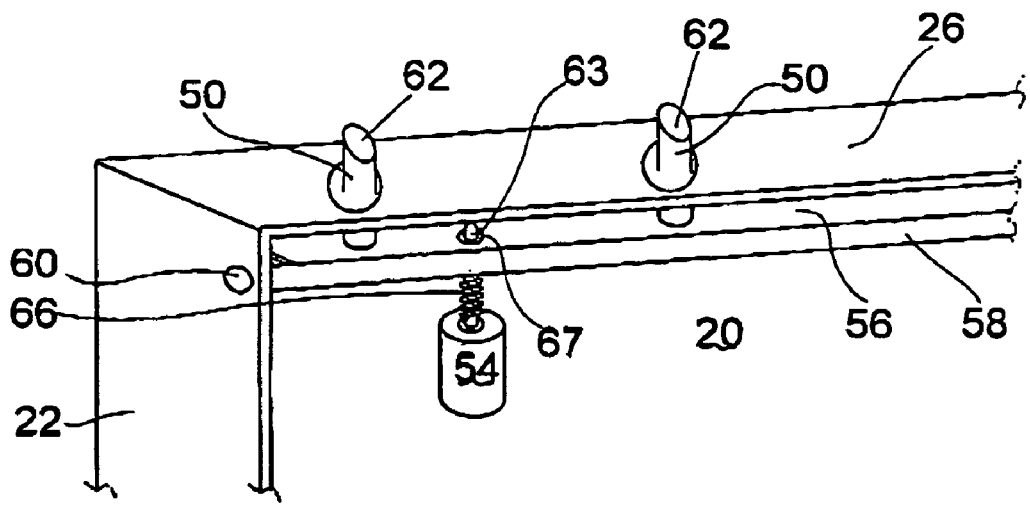
FIG. 12 is a perspective view of part of a locker in accordance with the embodiment of the invention that is shown in FIG. 11.

The locking means 14 that is illustrated in FIGS. 11 and 12 comprises a 12 V solenoid 54 that is attached to the back wall 20 of the locker. A top plate 56 is parallel to and spaced from the top wall 26. The top plate 56 is pivotally connected to side walls 22 and 24 through an axle 58 which is journalled for rotation in axle apertures 60 in the side walls 22 and 24. The apertures 60 may be blind bores on an internal face of each of the side walls 22 and 24 so that external access to the axle 58 is prevented. As best seen in the side view of FIG. 11, the axle 58 is a metal rod that is welded or otherwise fastened along an edge of the top plate 56. The top plate 56 has a plurality of locking pins 50 extending from an upper face. The locking pins 50 extend though corresponding apertures in the top wall 26 so that a bevelled end 62 of each of the locking pins rests above the top wall 26. The locking pins 50 are positioned so that the return section 40 of the door 12 rests against a back facing section of each of the locking pins 50 when the door is in the closed position. In this way the locking pins 50 lock the door 12 in the closed position as best seen in FIG. 11. The top plate 56 and locking pins 50 are biased to the extended position shown in FIG. 11 by a spring 66 mounted on the solenoid 54. A pin 67 of the relay protrudes through the top plate 56 and is held by a circlip 62. To unlock the door 12 the solenoid 54 causes the axle 58 and top plate 56 to rotate so that the locking pins 50 drop out of engagement with the return section 40. The door 12 can then be opened.

Figure 14:
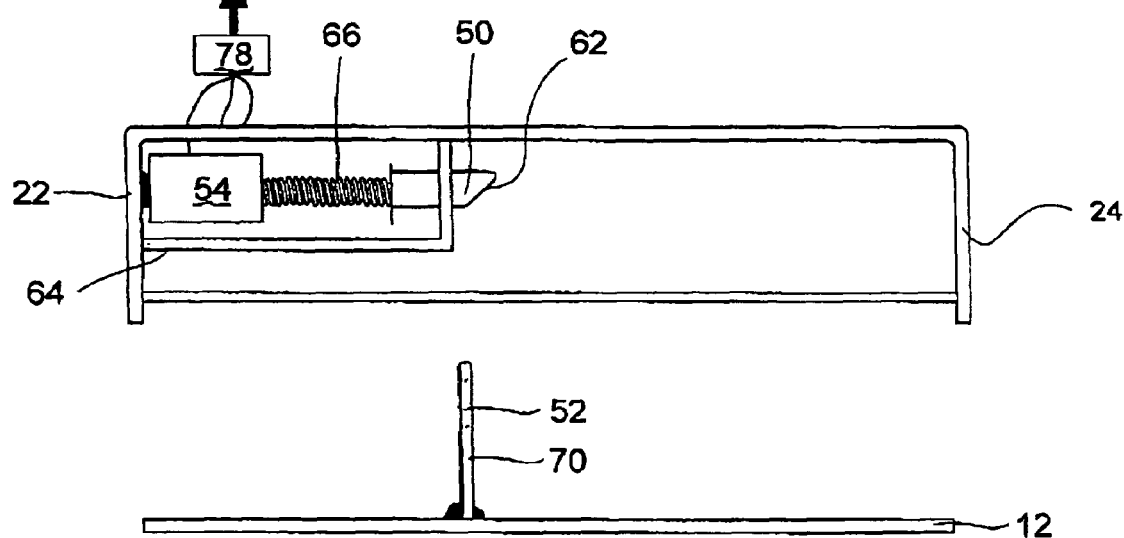
FIG. 14 is a part cross section exploded view from the top of a locker in accordance with another embodiment of the invention.

Another embodiment of the locking means 14 is shown in FIG. 14 in which a solenoid 54 is encased in a cover 64 inside of the locker 10. Again, the solenoid 54 actuates a locking pin 50. The locking pin 50 is biased to an extended position by a compression spring 66 which extends between the solenoid 54 and the locking pin 50. In the extended position, a bevelled end 62 of the locking pin 50 extends through an aperture in the cover 64 and into the main part of the locker 10. The solenoid 54 is attached to side wall 22 so that it is fixed relative to the locker 10. When activated, the solenoid 54 drives the locking pin 50 against the bias of spring 66 to thereby retract the locking pin at least partly into the cover 64. An inner face of the door 12 contains a rib 70 that extends orthogonally from the door 12. As best seen in FIG. 13, the rib 70 contains a catch 52 in the form of an aperture which is positioned on the rib so that when the door 12 is closed, the end of the locking pin 50 is able to extend through the aperture 52 to thereby lock the door 12 in the closed position. The rib 70 is welded, riveted or otherwise fixed to the inner face of the door 12.

Figure 18:
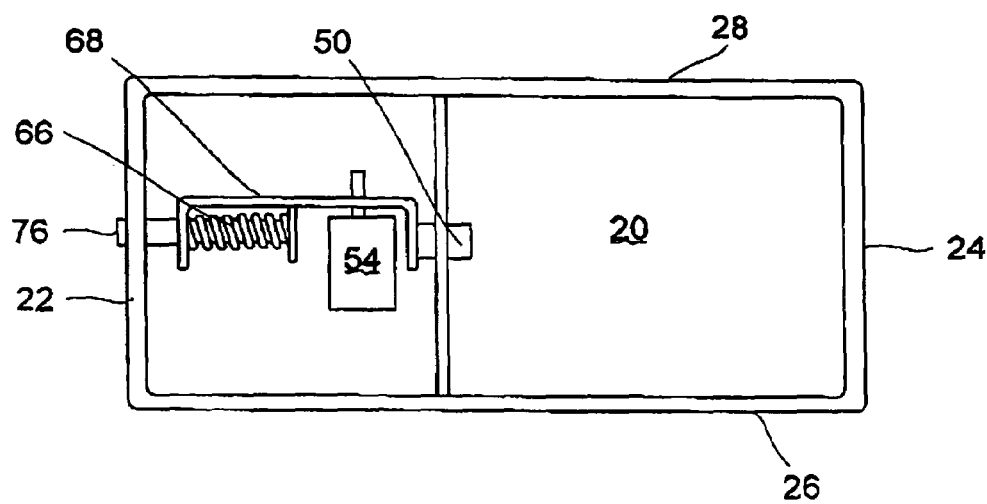
FIG. 18 is a front view of a locker (door not shown) in accordance with an embodiment of the invention.
Figure 19:
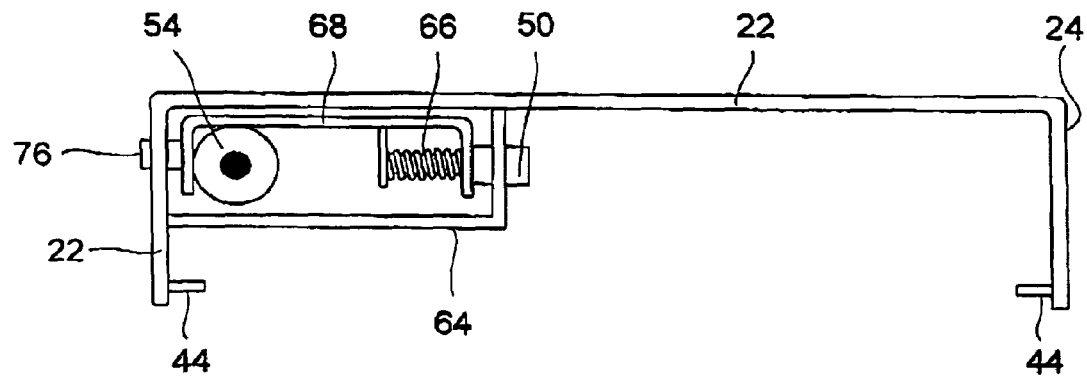
FIG. 19 is a part cross section exploded view from the top (door not shown) of a locker in accordance with an embodiment of the invention.

An alternative locking means 14 is shown in FIGS. 18 and 19. In this case the locking means is a deadbolt arrangement. The illustrated locking means is similar in operation to the one shown in FIG. 14 but locking pin 50 is moved to the locking position by depressing a locking button 76 after the door has been closed. A spring 66 opens the deadlock.

Figure 20:
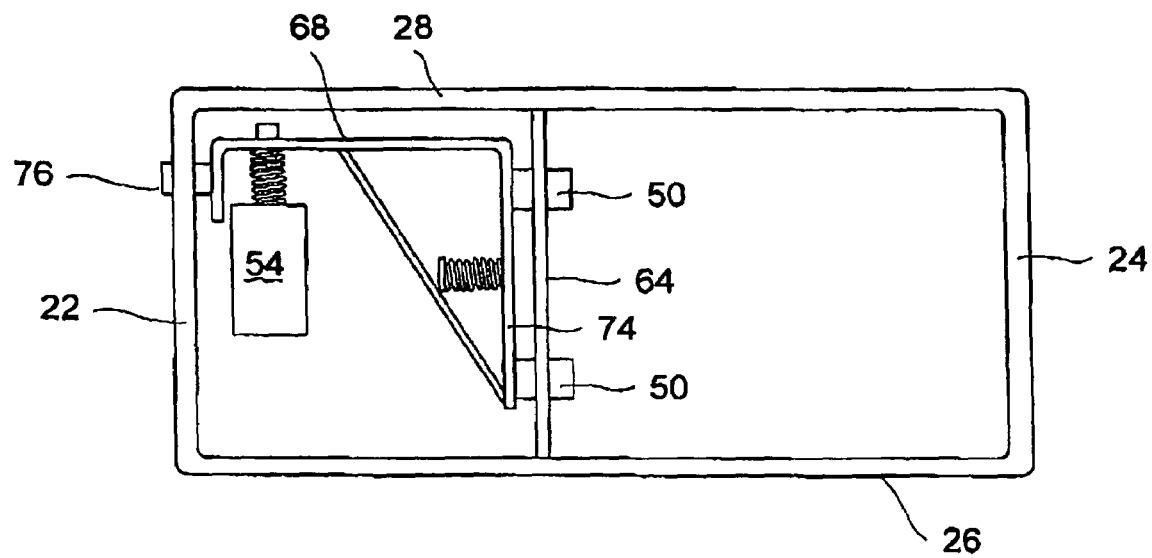
FIG. 20 is a part cross section view from the front of a locker in accordance with the embodiment of the invention that is shown in FIG. 19.
Figure 21:
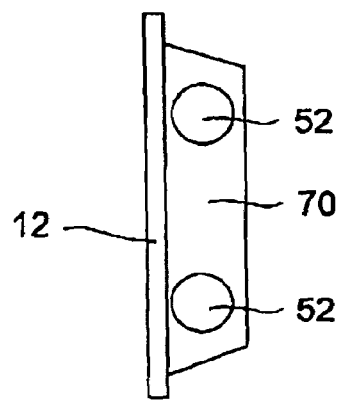
FIG. 21 is a part cross-section view of the locker of a door of a locker in accordance with the embodiment of the invention that is shown in FIG. 19.

A further alterative locking means 14 is shown in FIGS. 19 to 21. Again, the locking means operates in the same manner as the one described with reference to FIG. 14. However, in this case an arm 74 of a solenoid frame 68 is extended so that more than one locking pin 50 can be located on the frame. The locking means 14 also includes a locking button 76 which is accessible from the outside of the locker 10. The locking button 76 is attached to frame 68 and extends through an aperture in the side wall 22. The locking button 76 can be used to manually lock the door 12 in the closed position by depressing the locking button. This is necessary since the locking pins 50 are in the form of a deadlock and not a latch.

SUMMARY

In all cases, the solenoid 54 is in electrical connection with the input device 16 via relay 48 so that when the PIC is entered the relay 48 activates the solenoid 54 to retract the locking pin 50. When the locking pin is retracted the door is released from the locked position.

The relay 48, solenoid 54 and any other powered devices on or in the security locker 10 are powered from the battery of the vehicle. In addition, a back-up battery power source (for example an existing alarm backup battery) may also connected to the locker to supply battery power to the relay and other devices in the event of an interruption of supply from the vehicle battery.

The locker 10 includes an interface 78 for electrically connecting the keypad 16 to the existing alarm security system of the vehicle. In this way, the keypad 16 on the locker can be used to not only unlock the locker door 12, but also activate and deactivate the vehicle security system.

The interface 78 is in the form of a terminal block that is mounted within the locker 10 so that it is accessible from the back of the locker. In this way the locker can be hard wired into the security system of the vehicle by running the wiring into the back of the locker. The terminal block contains connections for power, a ground wire, normally closed and normally open wires, siren wires and battery back-up wires and may include provision for a remote mounted keypad and alarm status LED. Alternatively, the locker may contain an internal siren or other alarm component that can be activated and deactivated using the keypad 16.

Mode of Operation Detail

The security locker 10 may be fitted to a vehicle with an existing inbuilt (factory or aftermarket fitted) security alarm system. In such a case, the driver places the valuables in the security locker and upon closing the door 12 the locker is automatically locked by way of the catch 52 sliding over the end of the locking pin 50 or by closing the door 12 and then manually depressing the locking button 76 when the locking means is a deadbolt arrangement. At the same time the existing vehicle alarm security system is activated via an alarm output of the interface 78 which sends a signal to the existing alarm, bypassing the UHF alarm receiver of that alarm and so arming the existing alarm system. The activation signal may be used to activate switches and relays for the fuel cut off relay, a bonnet/boot switch, an ignition disabling switch, a siren or horn and/or the central locking of the vehicle. Vehicle security alarm systems are normally de-activated via hidden switches, code-operated UHF receivers or a code pad. In order to over-ride these mechanisms the security locker alarm supplies a short 12V pulse that simulates the de-activation pulse required to deactivate the vehicle security alarm system. To do so it is wired in parallel to the input device 16 of the locker via the terminal block or input wiring. A de-arming wire attached to the terminal block 78 is the wire used in this instance. Depending on the input required for the existing alarm, the security locker alarm can alternatively provide momentary pulses, constant voltage, open circuit conditions, or earth connection.

When the owner returns to the vehicle and the correct PIC is entered into the keypad 16 the lock relay 48 is activated for about three seconds. This actuates the solenoid 54 to withdraw the locking pin 50 allowing to the door 12 to be opened. At the same time a signal is sent to the alarm system to deactivate it by bypassing the UHF receiver of the alarm system, thus deactivating the inbuilt alarm system. The vehicle can then be entered in the usual way.

Additional Security Measure

In the event of tampering with the security locker 10, a latching relay latched by means of either a capacitor storage device, or backup battery voltage can be connected in such a way to ensure that if the door 12 is forced the vehicle's key or immobiliser transmitter will not start the vehicle for a period of time. If there are more than three incorrect entries entered in to the keypad, anti-tamper counters (electronic counting chips) on the electronics board of the keypad 16 can be used to prevent the car immobiliser switching off, thus preventing entry with the standard key or immobilizer transmitter for a predetermined period of time.

Forcing of the Security Locker

To prevent access to vehicle keys in the locker 10 by forcing open the door 12, an anti-tamper switch may be activated when the door 12 is opened but the PIC has not been entered. Again, this may be used to prevent entry with the standard key or immobilizer transmitter for a predetermined period of time.

Mode of Operation With a Locker Alarm System Fitted

In an alternative embodiment, the locker 10 may contain an inbuilt alarm system. In this mode of operation, the driver exits the vehicle, enters the PIC in to the keypad 16 to unlock the locker and then places valuables in the storage locker. Upon closing the door 12 the locker is locked via the locking pin 50 and catch 52 as described previously and the internal alarm may be activated by pressing the activate key '*' 46. The activation signal may also be used to activate switches and relays for the fuel cut off relay, a bonnet/boot switch, an ignition disabling switch, a siren or horn and/or the central locking of the vehicle. The latter components may be hard wired into the interface 78 when the locker is fitted to the vehicle. Upon returning to the vehicle, the driver enters the PIC into the keypad which then activates the relay 48 to retract the locking pin 50 to allow the door to be opened, and also deactivates the alarm system of the locker as well as the fuel cut off relay, the bonnet/boot switch, the ignition disabling switch and/or the central locking of the vehicle.

A further embodiment of the car security locker is shown in FIG. 13. In the figure the locking means 14 is encased in a cover 64. The front of the cover 64 contains an arming button 80 and an LED 82. After the vehicle is locked, the security locker is opened by means of the keypad 16. The keys and other valuables are placed in the open locker and the locker is then armed by pressing the arming button 80 which is located inside the security locker. When the security locker is armed the LED 82 is lit. The door 12 is then pushed closed.

Opening the Locker From Inside the Vehicle

In an alternative that is not illustrated, an additional flashing LED and additional keypad may be mounted near the driver's position inside the vehicle. In this case the security locker can be opened and/or armed in the convenience of the vehicle. A time delay is incorporated so as to allow exit and locking of the vehicle. The wiring of the additional arming button, additional flashing LED and additional keypad/button are connected in parallel to the corresponding buttons within the security locker, greatly increasing the ease of use of the locker.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A security locker for securing articles on a vehicle, the locker comprising:

a locker having at least one opening facing the exterior of the vehicle when the locker is fitted thereto, wherein the opening provides access to the interior of the locker when the vehicle is locked;

a door moveable between an open position in which the interior of the locker is accessible through the opening from outside of the vehicle when the locker is fitted thereto, and a closed position in which the interior of the locker is inaccessible;

locking means that, when activated, locks the door in a closed position to prevent unauthorized access to interior of the locker, and when deactivated unlocks the door to enable access to the locker;

an input device operatively connected to the locking means, wherein said locking means is accessible from outside the locked vehicle and it deactivates the locking means when an identifiable code is entered to thereby allow keyless entry to the locker;

an interface for connecting the input device to a security system of the vehicle such that entry of the identifiable code into the input device results in activation or deactivation of the security system.

2. A security locker according to claim 1, wherein the input device is a keypad that can be used to input the identifiable code.

3. A security locker according to claim 1, wherein the security system of the vehicle is selected from the group consisting of an alarm system, an immobilizer, an ignition disabling switch/relay and a fuel cut-off relay.

4. A security locker according to claim 1, further comprising a hinge that hingedly connects the door to the locker.

5. A security locker according to claim 4, wherein the hinge is located on the interior of the locker when the door is in the closed position.

6. A security locker according to claim 1, wherein the locking means comprises a locking pin attached to the locker and moveable between an extended position in which it is able to extend through an aperture in the door to lock the door in the closed position, and a retracted position in which the locking pin is retracted from the aperture in the door so that it can be opened.

7. A security locker according to claim 6, wherein the locking pin is biased to an extended position by a compression spring.

8. A security locker according to claim 1, wherein locker has dimensions that enable it to be fitted between the number plate on a vehicle and a body panel of the vehicle onto which the number plate is normally attached without substantially altering the appearance of the vehicle.

9. A security locker according to claim 1, wherein the locker is fitted in an opening in a panel of the body of the vehicle.

10. A security locker according to claim 9, wherein the door of the locker is flush with the panel of the vehicle when the door is in the closed position.

11. A security locker according to claim 1, wherein a first alarm output of the interface activates the existing vehicle alarm security system.

12. A security locker according to claim 11, wherein the alarm output activates switches and relays for a fuel cut off relay, a bonnet/boot switch, an ignition disabling switch, a siren or horn or central locking of the vehicle.

13. A security locker according to claim 11, wherein a second alarm output of the interface de-activates the existing vehicle alarm security system.

14. A security locker according to claim 13, wherein the second alarm output is a short 12V pulse that simulates the de-activation pulse required to deactivate the vehicle security alarm system.

15. A vehicle having a security locker according to claim 1 fitted thereto.

16. A vehicle according to claim 15, wherein the door of the locker is recessed within a panel of the vehicle, the vehicle including a flap that is moveable between a closed position in which the flap covers the locker, and an open position in which the door of the locker is accessible.

* * * * *